United States Patent Office 3,018,167
Patented Jan. 23, 1962

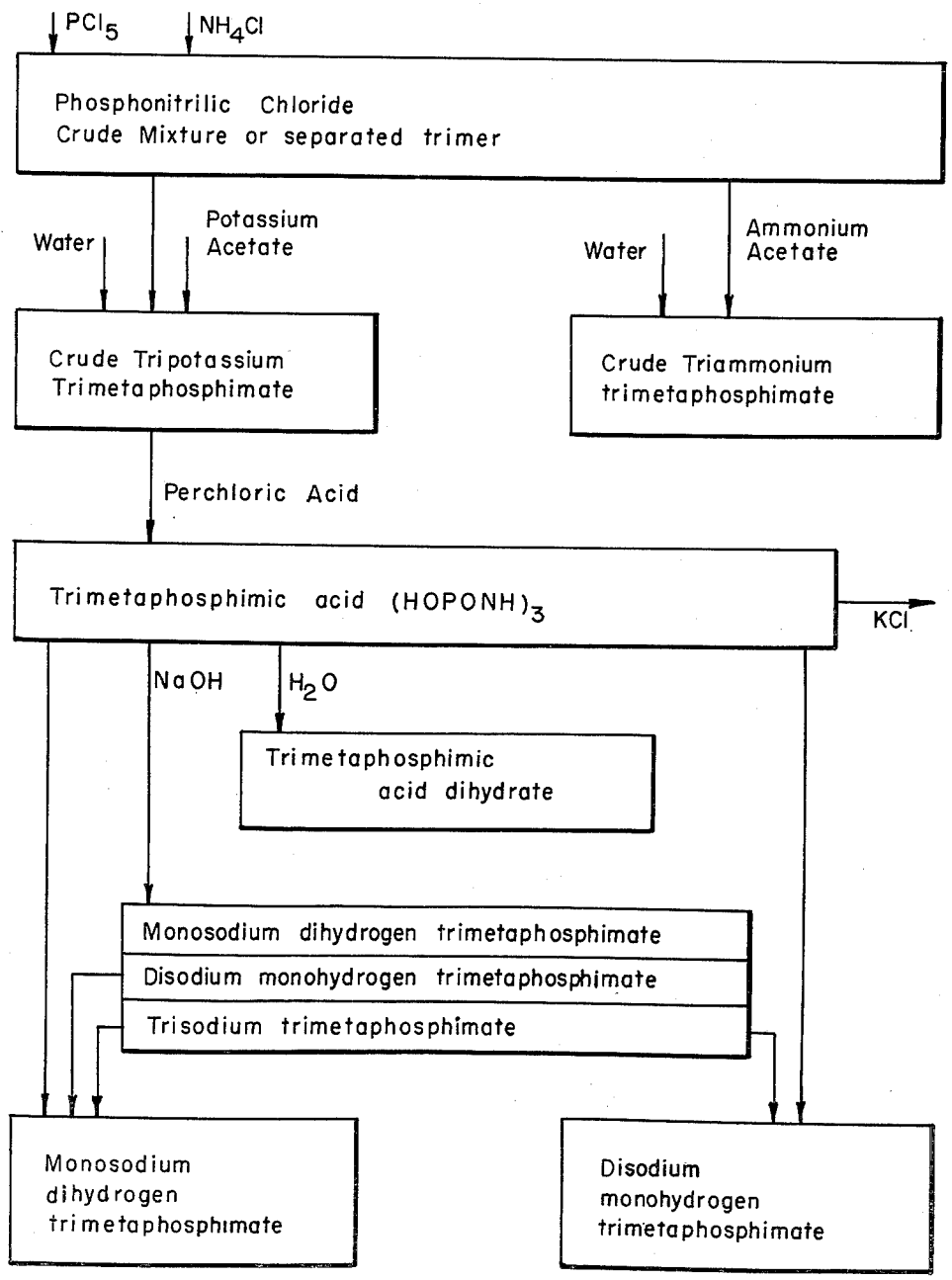

3,018,167
METHOD FOR PRODUCING TRIMETA-
PHOSPHIMIC ACID
Morris L. Nielsen, Dayton, Ohio, assignor to Monsanto
Chemical Company, St. Louis, Mo., a corporation of
Delaware
Filed Oct. 17, 1957, Ser. No. 690,865
3 Claims. (Cl. 23—165)

The present invention relates to new compositions of matter containing phosphorus and nitrogen. The invention relates particularly to new types of phosphorus-nitrogen compounds and their salts including trimetaphosphimates and tetrametaphosphimates.

It is an object of the invention to prepare new crystalline forms of trimetaphosphimic acid (HOPONH)$_3$, and tetrametaphosphimic acid (HOPONH)$_4$, and novel alkali metal, ammonium and amine salts of these acids which are of utility in various industrial applications. It is also an object of the invention to prepare rust inhibitors containing amine salts of trimetaphosphimic acid and tetrametaphosphimic acid.

The novel phosphorus-nitrogen compounds of the present invention are prepared by first reacting phosphorus pentachloride and ammonium chloride by intimately mixing the same and then heating the mixture to a temperature of from 100° C. to 200° C. The intermediate product thus obtained is a mixture of phosphonitrilic chlorides which can be distilled to yield the trimeric phosphonitrilic chloride, boiling point 356.5° C., as the principal product and the tetramer, boiling point 328.5° C., as the secondary product.

Although it is possible to hydrolyze the trimeric chloride to trimetaphosphimic acid and the tetramer to tetrametaphosphimic acid, solely by the use of water, the hydrolysis products are usually composed of a heterogeneous mixture of acidic compounds resulting from the hydrolysis and the decomposition of the acids. The resolution of such mixtures requires the separation of the acids from the complex mixture, such as by repeated crystallization or precipitation techniques, which have been found to be difficult and expensive.

An improved method for making the pure acids has now been found based upon the preliminary preparation of the potassium salt of the crude trimer or tetramer.

For this purpose the distilled trimer or tetramer is treated with aqueous potassium acetate in stoichiometric amount so as to form the tripotassium or the tetrapotassium salt of the corresponding acid. The salt is separated from the by-product potassium chloride by filtration or other means. The salt is then treated with perchloric acid, which treatment liberates the free trimeta- or tetrameta-phosphimic acid and precipitates the insoluble potassium perchlorate. Filtration is then employed to remove the insoluble precipitate from the water solution of the respective acids having the formula:

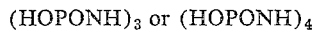
(HOPONH)$_3$ or (HOPONH)$_4$

It will be evident from the above formula that the trimeta-phosphimic acid has three acidic hydrogen atoms, while the tetra acid has four such acidic hydrogen atoms. Any one or all of these acidic hydrogen atoms may be neutralized by means of bases such as alkali metal or ammonium hydroxides, carbonates, bicarbonates, etc., thus forming the tri- or tetra-alkali metal salts, the ammonium salts or other salts having fewer than all of the acidic hydrogen atoms neutralized. An important feature of our invention is the formation of various amine salts of these acids as will be further described.

Instead of neutralizing all or part of the hydrogen atoms in these acids, I may by ordinary concentration or evaporation obtain the respective tri- and tetra-phosphimic acids in pure anhydrous crystalline form.

The acids and salts contemplated in the present invention may be designated by the general formula

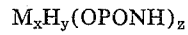
$M_xH_y(OPONH)_z$ in which $x$ is an integer from 0 to 4, $y$ is an integer from zero to 4, $z$ is an integer from 3 to 4. M represents a univalent radical selected from the group consisting of sodium, potassium, ammonium and half-amine radicals. The various salts of the present invention may also be prepared in hydrated form having from 1 to 7 moles of water per mole of the salt. When reference is made to the various salts, it is also intended to include the respective hydrates thereof.

These acids of the present invention may be prepared in the form of their respective hydrates, such as the dihydrates. In order to prepare such dihydrates the anhydrous acid is dissolved in water at room temperature, and alcohol is added, whereupon the dihydrate is thrown out of solution in the form of needle-like crystals.

The above process applicable either to tri- or tetrametaphosphimates is shown in schematic form in the drawing which is part of the present specification. In the flow sheet set forth in the drawing the starting materials are phosphorus pentachloride and ammonium chloride. These are reacted to give a crude mixture of phosphonitrilic chlorides composed predominantly of the trimer with minor proportions of the tetramer of phosphonitrilic chloride. The crude mixture of these chlorides, or a distilled fraction thereof, is then hydrolyzed by intimate admixture and reaction with water and potassium acetate. This results in the formation of a crude tripotassium trimetaphosphimate to obtain the desired trimetaphosphimic acid while at the same time precipitating potassium chloride.

The trimetaphosphimic acid may then be separated from the aqueous solution in which it is obtained at this point. Concentration of the aqueous solution by the evaporation of water yields the anhydrous acid, while precipitation from the aqueous solution, such as by the addition of a non-solvent, for example alcohol, results in the production of a hydrate of the acid, e.g., trimetaphosphimic acid dihydrate.

The flow sheet further indicates that salts of trimetaphosphimic acid, for example the sodium salt, may be obtained by reaction with the stoichiometric proportion of sodium hydroxide in order to obtain any of the three possible salts; monosodium dihydrogen, trimetaphosphimate, disodium monohydrogen trimetaphosphimate or trisodium trimetaphosphimate. The more highly alkaline salts may also be further reacted with the trimetaphosphimic acid as shown in the drawing. For example, either disodium monohydrogen trimetaphosphimate or trisodium trimetaphosphimate when reacted with additional trimetaphosphimic acid yields monosodium dihydrogen trimetaphosphimate. In the same manner, trisodium trimetaphosphimate when reacted with 0.5 mole of trimetaphosphimic acid yields disodium monohydrogen trimetaphosphimate.

The flow sheet also shows a method for the production of triammonium trimetaphosphimate which is advantageously employed in a crude form as a fertilizer component. An advantage of this compound as a fertilizer material is that the single compound supplies highly concentrated proportions of nitrogen and of phosphorus. In order to obtain the triammonium trimetaphosphimate, the crude mixture of phosphonitrilic chloride, or if desired, particular distilled fractions, is hydrolyzed by intimately mixing the said phosphonitrilic chloride with ammonium acetate and water, thereby obtaining the crude triammonium trimetaphosphimate.

It is an advantage of the present process that the potassium, sodium, and ammonium salts of trimetaphosphimic acid and tetrametaphosphimic acid can be manufactured in very pure form. It has been found that the separation process based upon the use of perchloric acid enables this result to be accomplished, while at the same time avoiding the production of undesirable hydrolysis products. In this method, fractional distillation of the original mixture of phosphonitrilic chlorides gives a narrow cut of starting material. The use of such a fraction makes it possible to direct the reaction to the substantial exclusion of higher species with the result that the compounds obtained are substantially pure salts of trimetaphosphimic acid or of tetrametaphosphimic acid. The fraction of phosphonitrilic chloride is reacted with a stoichiometric proportion of potassium acetate in the presence of water using an organic solvent, such as ether for the said phosphonitrilic chloride. The co-formed potassium chloride may be removed by crystallization or extraction with a suitable solvent. Metathesis of the potassium salt with perchloric acid results in the production of insoluble potassium perchlorate which is readily removed from the solution by filtration. The resultant solution consists predominantly of trimetaphosphimic acid or tetrametaphosphimic acid in water. The acid solution is concentrated by evaporating excess water, after which the crystalline acid is obtained by precipitation from the chilled solution. The pure trimetaphosphimic or tetrametaphosphimic acid may then be transformed into the mono-, di-, or tri- salts of sodium, potassium, or ammonium by stoichiometric neutralization with the desired basic material, for example, sodium hydroxide, sodium carbonate, potassium hydroxide or potassium carbonate. Ammonia may also be employed in either gaseous form or aqueous solution. In addition, higher alkaline salts, such as the trisodium salt may be reacted with the free acid to yield the mono- or disodium salts of trimetaphosphimic acids.

The desired salt is then preferably precipitated with a non-solvent such as alcohol or acetate. If desired, the salts may be crystallized from the saturated solution by evaporating and/or cooling.

The class of amine salts of trimetaphosphimic acid and tetrametaphosphimic acid are prepared by direct stoichiometric neutralization of the acid, such as by the use of an acetic acid solution of o-tolidine which is mixed with the trimetaphosphimic acid or its salts in order to obtain the o-tolidine salt. The same method is applicable to tetrametaphosphimic acid in order to obtain the corresponding amine salts. The amines which may be employed include ethylenediamine; m-phenylenediamine; p-phenylenediamine; naphthidene; β-naphthylamine; 4,4'-diaminodibenzyl; 4,4'-diaminostilbene and 4,4'-diaminotolane. A preferred group of amines are benzidene, a-tolidine, o-dianisidine, monoalkyl- and dialkylbenzidines. In the present group of amine salts, the amines are combined with the said acid moiety, $(HOPONH)_3$, and $(HOPONH)_4$, respectively, in the proportion of four half-amine radicals to one acid moiety.

The amine salts of trimetaphosphimic acid and tetrametaphosphimic acid are generally insoluble in water but are soluble in molten acetamide, formamide and urea. The reaction which the salts have in water upon prolonged contact is one of substantial neutrality.

The amine salts of trimetaphosphimic acid, for example, the o-tolidine or benzidine salts, are water-insoluble materials which decompose upon heating to release ammonia or free amines. These amine salts may be utilized as antioxidants, which are of particular utility in rubber, lubricating oil, and in antifreeze compositions. The amine salts may also be employed as biocides, for example, as a component of a ship's bottom paint in order to prevent the growth of barnacles. The amine salts also have utility as indicators in a test for free halogen, for example, chlorine. For example, the o-tolidine salt of trimetaphosphimic acid turns from white to dark blue in the presence of free chlorine, bromine, or iodine.

Another field of utility for the amine salts of trimetaphosphimic acid and tetrametaphosphimic acid is as a corrosion inhibitor for steel and other ferrous metals. For this purpose, the said amine salts may be employed in a water- or oil-base paint which is applied to the steel or iron surfaces. However, the amine salts may also be employed as corrosion inhibitors in aqueous solutions by suspension in aqueous solution, for example, as a minor component in a cooling water system which must be circulated through the cast iron jacket of an internal combustion engine to cool the engine. The hot water from the engine is then cooled in a heat exchanger or cooling tower in which the water is subjected to an aeration treatment. In this relationship, the amine salt also serves to reduce bacteria and algae growth in the system.

The salts such as mono- and disodium, as well as the corresponding phosphorus salts of tri- and tetrametaphosphimic acid, are water-soluble materials which possess leavening activity. These compounds may therefore be formulated with sodium bicarbonate to give a controlled degree of leavening activity for use in baking. These salts are also useful as blowing agents which release ammonia or an amine as well as phosphorus acids in the manufacture of foamed plastics.

Another use for the present salts is as an acid reacting catalyst in the condensation of urea-formaldehyde and melamine-formaldehyde resins.

The trimetaphosphimic acid in crystalline form as obtained by the method of the present invention may be utilized as a fire-retardant agent which can be applied directly or from the solution to cellulosic material, such as cotton cloth in order to render the cloth resistant against the propagation of a flame.

The acid may also be employed as a soldering flux since the acid, both in the anhydrous or hydrated form, exists in a solid form which is stable at relatively high temperatures, but decomposes at about 200° C. with the release of phosphoric acid which cleans the metallic surface to be soldered. The acid, particularly in the anhydrous form, is also of utility as a dehydrating agent, and as an alkylating agent in various chemical reactions.

The above discussion has been directed primarily towards the production of highly pure forms of trimetaphosphimic acid, tetrametaphosphimic acid and their salts. However, it is often desirable in the manufacture of fertilizer components to use a technical grade of these products. The present invention therefore also contemplates the use of crude or less highly refined distilled trimer and tetramer mixtures of phosphonitrilic chloride, including various proportions of mixtures of the trimer and tetramer. In order to make use of such crude mixtures, the hydrolysis reaction is conducted with the stoichiometric amount of the alkali metal or ammonium acetate in water with the consequent production of the corresponding salts. The alkali metal or ammonium trimetaphosphimate and the co-formed tetrametaphosphimate salts thus obtained are particularly useful in fertilizers. For example, the potassium salts provide the three essential elements, e.g., phosphorus, nitrogen and potassium in a single chemical compound, which therefore aids in the formulation of fertilizers for specific crops.

The following examples illustrate specific embodiments of the present invention.

*Example 1*

The tripotassium salt of trimetaphosphimic acid was prepared by first carrying out the hydrolysis of trimeric phosphonitrilic chloride in the presence of potassium acetate. Twelve grams of trimeric phosphonitrilic chloride was dissolved in 120 ml. of water and the solution stirred vigorously together with a solution of 60 grams of anhydrous potassium acetate in 30 ml. of water for a period of 50 hours. The solid product was then filtered off and was purified by dissolving the same in a minimum quantity of water and precipitating with alcohol. This recrystallization was repeated until the solid product was free of potassium chloride. The yield was 4.5 g. of a product which upon analysis was found to correspond to the formula $K_3(OPONH)_3$ and having the analysis: 11.71% N (11.96% calcd.), 26.26% P (26.45% calcd.), and 31.3B K (33.4% calcd.).

*Example 2*

Trimetaphosphimic acid was prepared in pure crystalline form as follows. To a solution of 4.5 g. of tripotassium trimetaphosphimate in 12.5 ml. of ice-cold water, there was slowly added 6.0 ml. of 72% perchloric acid. The precipitated potassium perchlorate was removed by filtration after which the residual solution was evaporated to dryness under vacuum while maintaining the temperature at below 35° C. The precipitated solids were washed with a mixture of ethyl acetate and methanol (80:20 proportions by volume) to remove traces of potassium perchlorate leaving 3 g. of pure anhydrous trimetaphosphimic acid. Analysis showed the compound to be $$H_3(OPONH)_3$$

having 17.9% N (17.73% calcd.). The anhydrous acid crystallized as monoclinic platelets. The X-ray diffraction analysis of the anhydrous acid showed the material to be characterized by interplanar distances for the 3 strongest lines as follows: 6.41; 3.31; and 6.11 Angstroms. The acid equivalent determination gave 79 (79 calcd.).

The trimetaphosphimic acid was also prepared as the dihydrate by dissolving the anhydrous acid described above in the minimum quantity of water at room temperature, and then adding hexane and alcohol to precipitate needle-like crystals. In contrast to the anhydrous crystals which decomposed at about 150° C., the hydrated form was found to melt at 110° C. Analysis showed the compound to be $H_3(OPONH)_3 \cdot 2H_2O$ having 15.40% N (15.9% calcd.) and 33.89% P (34.03% calcd.). The needle-like crystals of trimetaphosphimic dihydrate were subjected to X-ray diffraction analysis and were found to be characterized by interplanar distances as follows for the 3 strongest lines: 5.44; 4.65; and 6.97 Angstroms. The acid equivalent determined for the dihydrate was 91 (91 calcd.).

*Example 3*

Monosodium dihydrogen trimetaphosphimate was made by partial neutralization of the anhydrous trimetaphosphimic acid with trisodium trimetaphosphimate (previously obtained by the direct stoichiometric neutralization of the free acid with sodium hydroxide), in accordance with the equation $$2H_3(OPONH)_3 + Na_3(OPONH)_3 \rightarrow 3NaH_2(OPONH)_3$$

The preparation was carried out by dissolving 3.6 g. of trimetaphosphimic acid in 30 ml. of water. To this solution there was then added 2.84 g. of trisodium trimetaphosphimate. The solution was evaporated under vacuum at a maximum temperature of 35° C. yielding a crop of crystals weighing 6.6 g. Analysis of the product showed the compound to be $NaH_2(OPONH)_3 \cdot 2H_2O$ containing 14.20% N (14.24% calcd.), 31.37% P (31.50% calcd.), and 7.7% Na (7.8% calcd.).

*Example 4*

Disodium monohydrogen trimetaphosphimate was made by partial neutralization of the free acid with sodium hydroxide. To a solution of 1.18 g. of trimeric acid in 3 ml. of water there was added 0.4 g. of sodium hydroxide dissolved in 2 ml. of water. The solution was evaporated under vacuum at a maximum temperature of 35° C. until a thick paste was obtained. This was then treated with methanol to precipitate needle-shaped crystals which were recovered by filtration giving a yield of 1.40 g. Analysis showed the compound to be $$Na_2H(OPONH)_3 \cdot 2.5H_2O$$

having the elementary analysis of 12.86% N (12.95% calcd.), 28.38% P (28.52% calcd.), and 14.5% Na (14.1% calcd.).

*Example 5*

The production of the ammonium salt of trimetaphosphimic acid was conducted by beginning with a crude mixture of the polymers of phosphonitrilic chloride which had been obtained by heating a mixture of $PCl_5$ and $NH_4Cl$ to a temperature of from 100° C. to 200° C. It was found that the mixture of polymeric phosphonitrilic chloride could be distilled to obtain a substantially pure fraction of the trimeric and tetrameric form of the chloride. Twelve grams of the trimeric phosphonitrilic chloride was dissolved in 120 ml. of water and the solution stirred vigorously with a solution of 50 g. of ammonium acetate in 40 ml. of water for a period of 50 hours. The solid product which formed was filtered off and was then purified by dissolving the same in a minimum quantity of water and precipitating the triammonium salt of trimetaphosphimic acid with alcohol. This precipitation was repeated until the solid product was free of ammonium chloride. The yield was 4.5 g. of product which upon analysis was found to correspond to the formula $(NH_4)_3(OPONH)_3 \cdot H_2O$ and to have the analysis: 27.19% N (27.46% calcd.), 29.40% P (30.36% calcd.).

The corresponding ammonium salt of tetrametaphosphimic acid was found to correspond to the formula $(NH_4)_4(OPONH)_4 \cdot 4H_2O$ and to have the analysis: 24.55% N (24.56% calcd.), 26.95% P (27.16% calcd.).

*Example 6*

The amine salts of trimetaphosphimic acid and tetrametaphosphimic acid were prepared by employing 1% solutions of the respective amine dissolved in acetic acid. This solution was prepared by dissolving 0.1 g. of the recrystallized base, for example, o-tolidine in 3.3 ml. of glacial acetic acid to which 6.7 ml. of water was added. To the above solution, there was then added, by dropwise addition, an aqueous solution of the trimetaphosphimic acid or tetrametaphosphimic acid or the sodium salts thereof (10% by weight solution in water) until the mixture became turbid. The amine salt was then observed to settle out and was completely removed by filtration. The amine salts were all found to be white crystalline solids. The properties of the various amine salts thus obtained are summarized below:

| Compound | Interplanar Distances of 3 Strongest Lines (A) | | |
|---|---|---|---|
| Trimetaphosphimate ethylenediamine $[C_2H_8N_2]_2[(HOPONH)_3] \cdot H_2O$ | 8.30 | 3.44 | 4.40 |
| p-Phenylenediamine $[C_6H_8N_2]_2[(HOPONH)_3] \cdot 6H_2O$ | 10.85 | 5.10 | 4.87 |
| Benzidine $[C_{12}H_{12}N_2]_2[(HOPONH)_3] \cdot 2H_2O$ | 16.5 | 8.20 | 4.61 |
| o-Tolidine $[C_{14}H_{16}N_2]_2[(HOPONH)_3] \cdot 2H_2O$ | 15.5 | 14.4 | 3.47 |
| Tetrametaphosphimate o-tolidine $[C_{14}H_{16}N_2]_2[(HOPONH)_4] \cdot 8H_2O$ | 17.2 | 8.72 | 4.98 |

*Example 7*

The utility of the o-tolidine salt of trimetaphosphimic acid as a corrosion inhibitor was demonstrated by preparing a series of suspensions respectively containing: I, 2%; II, 0.5%; III, 0.1% by weight of the o-tolidine salt of trimetaphosphimic acid. Another solution, IV, containing only water was employed as a control in the tests. The four solutions were placed in test tubes into which small polished samples of mild steel were placed. It was observed that at the end of 24 hours the three solutions, I, II, and III, containing the amine salt of trimetaphosphimic acid exhibited substantially no rusting of the steel, while the control solution, IV, showed substantial rusting of the specimen.

In general, it has been found that aqueous or organic solutions or dispersions containing from 0.01% to 5% by weight of the amine salt, are useful for corrosion inhibition.

What is claimed is:

1. Trimetaphosphimic acid, $H_3(PO_2NH)_3$, in crystalline form having the characteristics of crystallizing as monoclinic platelets and having an X-ray diffraction pattern in which the interplanar distances are 6.41 Angstroms, 3.31 Angstroms, and 6.11 Angstroms.

2. Trimetaphosphimic acid dihydrate $$H_3(PO_2NH)_3 2H_2O$$

having the characteristics of crystallizing in a needle form and having the X-ray diffraction pattern in which the interplanar distances are 5.44 Angstroms, 4.65 Angstroms, and 6.97 Angstroms.

3. Method for the preparation of trimetaphosphimic acid which comprises hydrolyzing trimeric phosphonitrilic chloride in aqueous solution in the presence of potassium acetate to form the tripotassium salt of trimetaphosphimic acid and thereafter acidifying the said tripotassium salt of trimetaphosphimic acid with perchloric acid to precipitate potassium perchlorate, removing the said potassium perchlorate and evaporating the residual solution to dryness to obtain trimetaphosphimic acid as monoclinic platelets having an X-ray diffraction pattern in which the interplanar distances are 6.41 Angstroms, 3.31 Angstroms and 6.11 Angstroms.

References Cited in the file of this patent

UNITED STATES PATENTS

| | | |
|---|---|---|
| 1,271,002 | Allen | July 2, 1918 |
| 1,861,890 | Tschunkur | June 7, 1932 |
| 2,272,414 | McCullough | Feb. 10, 1942 |
| 2,515,529 | Ryznar et al. | July 18, 1950 |
| 2,538,867 | Greger | Jan. 23, 1951 |
| 2,587,861 | Krause | Mar. 4, 1952 |
| 2,600,813 | Tidwell | June 17, 1952 |
| 2,658,817 | Martin et al. | Nov. 10, 1953 |

OTHER REFERENCES

American Chemical Journal, Stokes, vol. 18, 1896, pages 629–663 and 780–790.

American Chemical Journal, Stokes, vol. 20, 1898, pages 740–760.